US009781917B1

(12) United States Patent
Pribyl

(10) Patent No.: US 9,781,917 B1
(45) Date of Patent: Oct. 10, 2017

(54) ANIMAL TRAP

(71) Applicant: Diverse Global Sourcing, Inc., Maple Lake, MN (US)

(72) Inventor: Ralph Pribyl, Maple Lake, MN (US)

(73) Assignee: DIVERSE GLOBAL SOURCING, INC., Maple Lake, MN (US)

( * ) Notice: Subject to any disclaimer, the term of this patent is extended or adjusted under 35 U.S.C. 154(b) by 504 days.

(21) Appl. No.: 14/565,122

(22) Filed: Dec. 9, 2014

Related U.S. Application Data

(60) Provisional application No. 61/913,689, filed on Dec. 9, 2013.

(51) Int. Cl.
*A01M 23/34* (2006.01)
*A01M 23/00* (2006.01)

(52) U.S. Cl.
CPC ............ *A01M 23/34* (2013.01); *A01M 23/00* (2013.01)

(58) Field of Classification Search
CPC combination set(s) only.
See application file for complete search history.

(56) References Cited

U.S. PATENT DOCUMENTS

| 2,894,352 | A | * | 7/1959 | McDonald | A01M 23/34 43/87 |
| 4,471,560 | A | * | 9/1984 | Hughan | A01M 23/34 43/85 |
| 4,601,128 | A | * | 7/1986 | Danison | A01M 23/34 43/82 |
| 4,802,301 | A | * | 2/1989 | Isborn | A01M 23/24 43/58 |
| 6,658,787 | B1 | * | 12/2003 | Bonnot | A01M 23/26 43/58 |
| 8,484,886 | B2 | * | 7/2013 | Stephens | A01M 23/34 43/82 |
| 2005/0274057 | A1 | * | 12/2005 | McCulloch | A01M 23/245 43/85 |
| 2010/0275503 | A1 | * | 11/2010 | Ziegmann | A01M 23/245 43/85 |
| 2011/0289821 | A1 | * | 12/2011 | Bonnot | A01M 23/34 43/86 |
| 2014/0026466 | A1 | * | 1/2014 | Ziegmann | A01M 23/24 43/92 |
| 2014/0298711 | A1 | * | 10/2014 | Stephens | A01M 23/34 43/85 |

* cited by examiner

*Primary Examiner* — Christopher P Ellis
(74) *Attorney, Agent, or Firm* — Westman, Champlin & Koehler, P.A.; Z. Peter Sawicki; Amanda M. Prose

(57) ABSTRACT

A trap for retaining a live animal includes a housing, a spring-biased loop retainer movable into and out of the housing and a latch having an arcuate section. A trigger is disposed to engage an aperture in the latch wherein the trigger is positioned to extend into and out of the housing such that the arcuate section of the latch engages the spring-biased loop retainer to move the loop retainer into the housing. A method of setting a trap for catching a live animal comprises moving a restraining segment of an animal leg retainer into a housing by engaging an arcuate section of a latch against the retainer. The arcuate section is engaged by applying a downward force to the latch to cause the restraining segment to be positioned in a set position for engaging the animal leg.

8 Claims, 8 Drawing Sheets

ANIMAL TRAP

CROSS-REFERENCE TO RELATED APPLICATION(S)

The present application is based on and claims the benefit of U.S. provisional patent application Ser. No. 61/913,689, filed Dec. 9, 2013, the content of which is hereby incorporated by reference in its entirety.

BACKGROUND

Animal traps are devices used to remotely catch and trap animals. Devices similar to the present invention are used to live trap smaller animals while inflicting the least amount of physical injury to the animal as possible. Such traps are of the type wherein a trapper must manually set and position each trap. These trapping devices, usually referred to as foothold traps, generally comprise a latch and trigger system wherein the restraint is spring based. Since the restraints must quickly snap around an animal's limb, the traps and all the components are generally made of steel in order to withstand a trapped animal's attempts to escape.

One problem associated with many of the devices of the prior art relates to the trapper's ability to set the trap. These traps generally use heavy-duty steel springs, which require a significant amount of force and exertion on the part of the trapper in setting the trap. Since these types of traps must tightly and quickly clamp the animal's limb into the device in order to hold the animal in spite of the animal's attempts to remove its limb, the spring force exerted during trapping is generally great. Thus, the restoring force needed to set the trap is also significant. Many trappers have difficulty setting the traps by hand and require addition tools to do so. The task of setting the traps is also exhausting and the resulting strain on the trapper's hands is multiplied each time the trapper sets a trap as in many instances, multiple traps are set.

Moreover, traps of the prior art require the animal's limb to displace and effectively release a trigger to engage the restraint and trap the animal. Prior art triggers are generally lengths of steel simply extending into the trap. A problem associated with these triggers arises in that other animals may have access to the traps without displacing the trigger. Additionally, based on the prior art designs, a significantly sized limb, with a greater amount of force is needed to displace these triggers.

SUMMARY OF THE INVENTION

The present disclosure relates to a trap for retaining a live animal. The trap of the present disclosure includes a housing, a spring-biased loop retainer movable into and out of the housing and a latch having an arcuate section. The trap also includes a trigger disposed to engage an aperture in the latch wherein a trigger is positioned to extend into and out of the housing such that the arcuate section of the latch engages the spring-biased loop retainer to move the loop retainer into the housing.

The present disclosure also relates to a method of setting a trap for catching a live animal. The method comprises moving a restraining segment of an animal leg retainer into a housing by engaging an arcuate section of a latch against the retainer. The arcuate section is engaged by applying a downward force to the latch to cause the restraining segment to be positioned in a set position for engaging the animal leg.

DETAILED DESCRIPTION

The present disclosure is directed to a trapping device for catching and holding a live animal. The device may be used for pest control and can be used to effectively trap raccoons and other rodents or animals of similar size. The trap, as illustrated generally in the figures, comprises a tube in which bait can be placed, the type of bait being selected based on the animal to be trapped. When the device is used to trap an animal, the animal will generally insert a limb into the tube in an attempt to reach or grab the bait. At the point when the animal reaches into the tube, the animal's limb will displace a trigger upon contact with a trigger plate or trigger bar, which will release a latch, resulting in the snapping, in a backward direction, of a restraint. The restraint then holds the animal to the trap by clamping its limb in the tube. The device may also be secured to the ground to prevent the animal from running off with the trap.

Figure 1A:
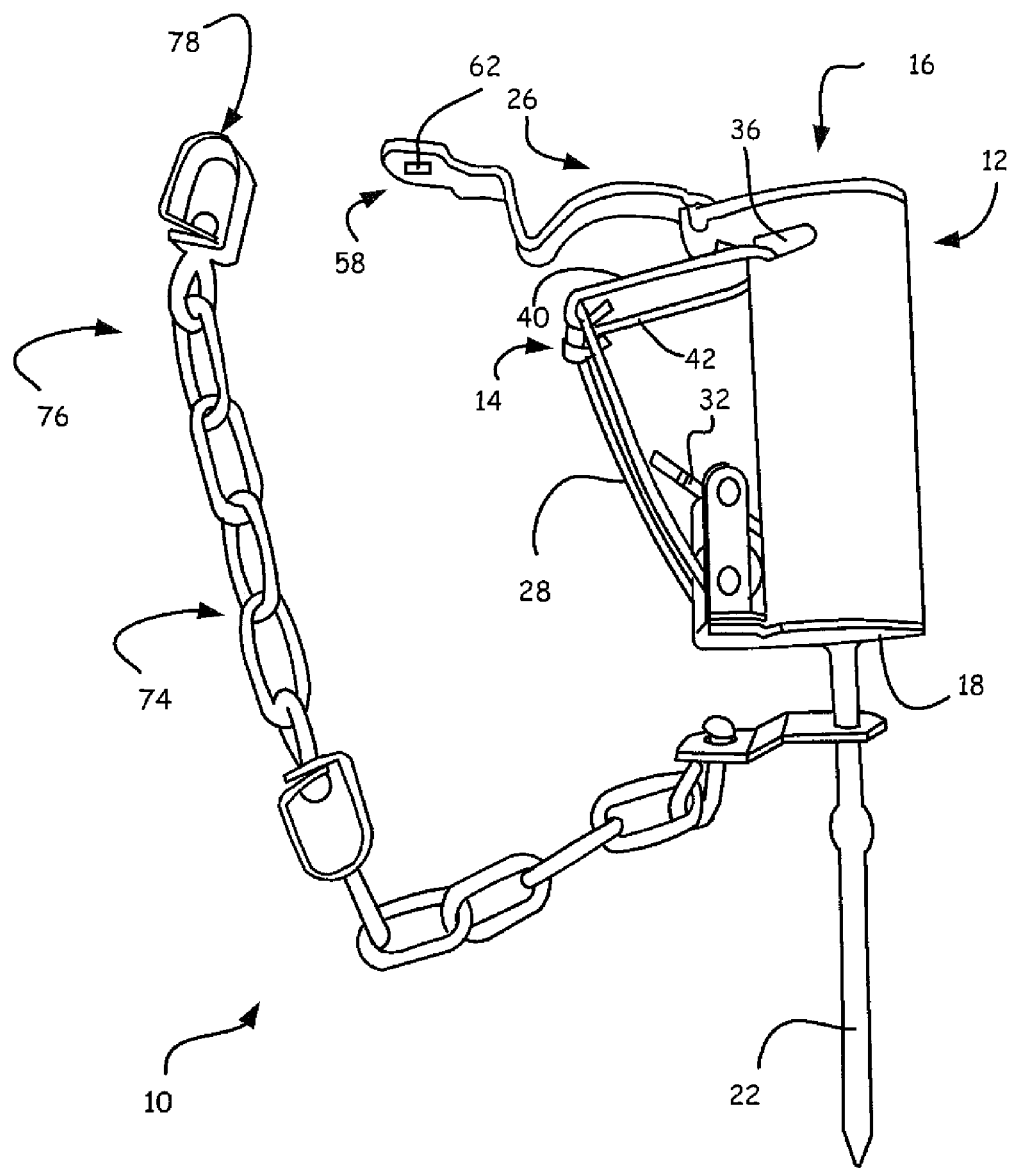
FIG. 1A is a side view of a live-trap of the present disclosure.
Figure 1B:
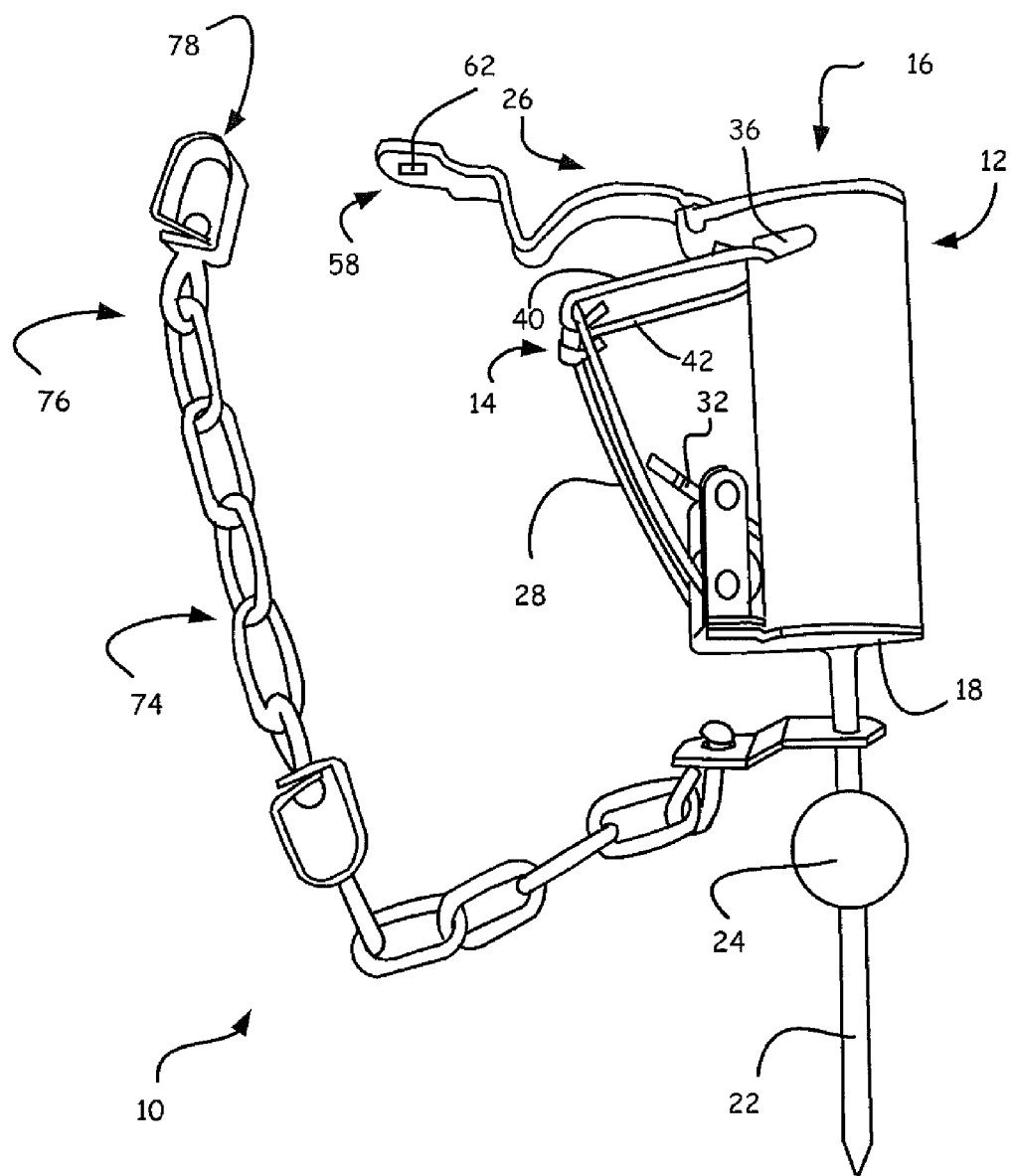
FIG. 1B is a side view of the trap having an alternative embodiment of a ground securing stake.
Figure 2:
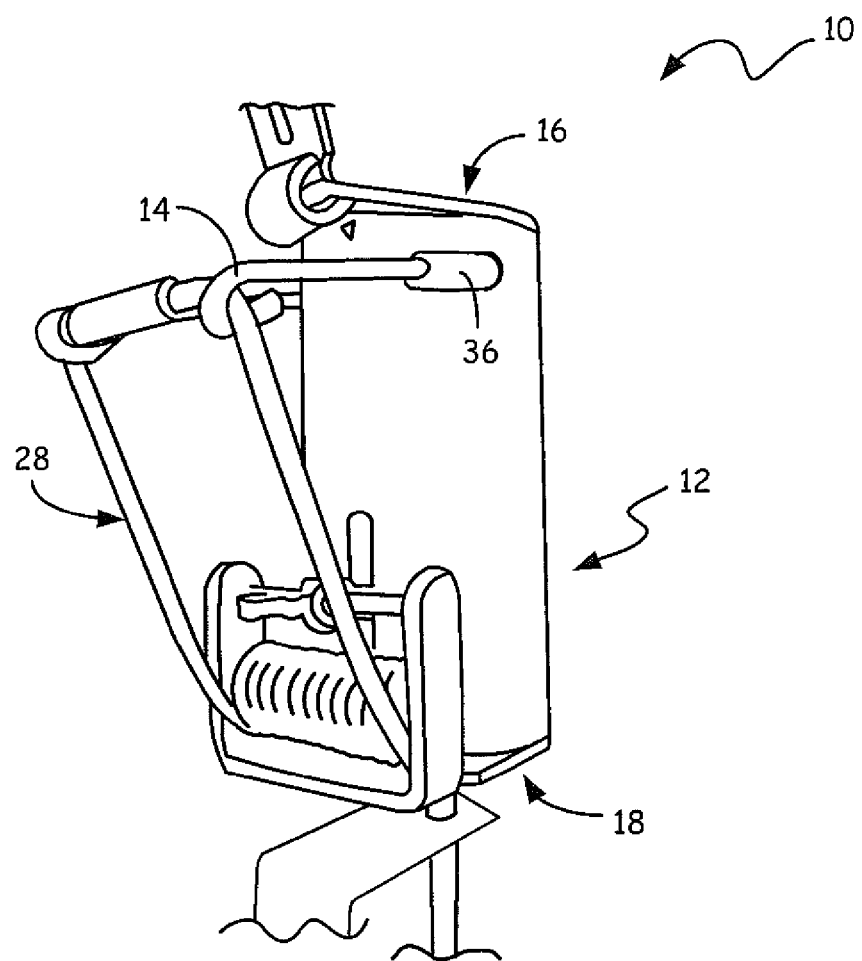
FIG. 2 is a back perspective view of a retaining section of the trap.

The device 10, as illustrated generally in FIG. 1, is a tube 12 adapted with a retainer 14. FIGS. 1 and 2 illustrate the device in a restrained configuration. That is, if an animal's limb were inserted in the tube 12, it would be held there by the retainer 14.

The tube 12 is open on a top or an upwardly facing end 16 and is also adapted with a floor 18 at an opposing or bottom end 20. The tube 12 may be cylindrical or of any other cross-section shape, such that the tube is sufficient in length and width for insertion of bait as well as insertion and securing of a limb of an animal to be trapped. The floor 18 may be a flat plate, a plate adapted with openings or even a fine mesh screen. The bottom end 20 of the tube is adapted with a stake 22 extending outwardly and downwardly from the floor 18. The stake 22 is generally positioned approximately in the center of the tube with respect to the cross-section of the tube 12, however more than one stake may be used and the stakes may be positioned as necessary with respect to the tube. The stake 22 allows a trapper to secure the device into either a ground surface or another ground-engaging stake or surface. The stake 22 is a steel rod which may have a pointed tip, however the stake may be adapted with various tips including a rounded end tip, a threaded tip or am arrow-shaped tip. As illustrated in FIGS. 1A and 1B, the stake 22 may additionally be adapted with a transverse facing plate 24 or bar along its length. The plate 24 or bar along the length of the stake 22 may acts to further stabilize the device in an upright position when the stake 22 is inserted into the ground.

The tube 12 is further adapted with a latch 26, a spring-loaded wire frame 28, a rotatable cylinder 30 and a trigger 32. Each component cooperates to set the device for trapping, as well as to trap the animal itself.

The retainer 14 includes a metal wire adapted with a looped portion 34 such that when engaged, the looped length 34 will secure the animal's limb in the tube. The looped or rounded portion 34 of the retainer 14 extends inwardly into the tube 12, proximate a top section of the tube 12, and two corresponding apertures 36 and 37 near the upper portion of the tube 12 allow the retainer 14 to extend into and across the tube and to allow the retainer to move from a set position to a trapped position with respect to the tube 12. The apertures 36 and 37 are adjacent to one on another and correspond to the loop and its ends 40 and 42 such that a first side of the looped section 34 and end 40 are movable into and out of aperture 36 while a second side of the looped section 34 and end 42 are simultaneously movable into and out of aperture 37. The apertures are positioned in a side portion of the tube proximate the top section of the tube. The retainer is moveable in the direction of arrows 38. The retainer 14 comprises two ends 40 and 42, which extend away from the loop 34 and thus away from the tube 12. The ends 40 and 42 are generally straight lengths of wire, horizontal to the ground. The ends 40 and 42 are connected to the spring-loaded wire frame 28.

The spring-loaded wire frame 28 is generally a rectangular frame extending along a length of the tube 12 wherein the bottom portion of the frame comprises the spring 44. The spring 44 is attached to the tube 12 proximate the base of the tube 12 and may be further connected to the bottom of the tube 12. The rectangular portion of the spring-loaded frame 28 also has two substantially parallel and vertical lengths of wire which are connected by a horizontal section of wire 46. The horizontal length of wire 46 is positioned proximate the top of the tube 12 and the ends 40 and 42 connect to the spring-loaded frame 28 and each opposing end of the length 46. The hollow, rotatable cylinder 30 is shorter in length and slightly larger in diameter than the horizontal length of wire 46 and the cylinder 30 surrounds the horizontal section of wire 46 of the spring-loaded frame 28. The rotatable cylinder 30 is rotatable around the horizontal length of wire 46 and is held in position by the length of wire 46. The rotatable cylinder 30 supports easier setting of the retainer 14, by cooperating with an underside surface of the latch 26 when the latch 26 is displaced downwardly during setting.

Figure 3:
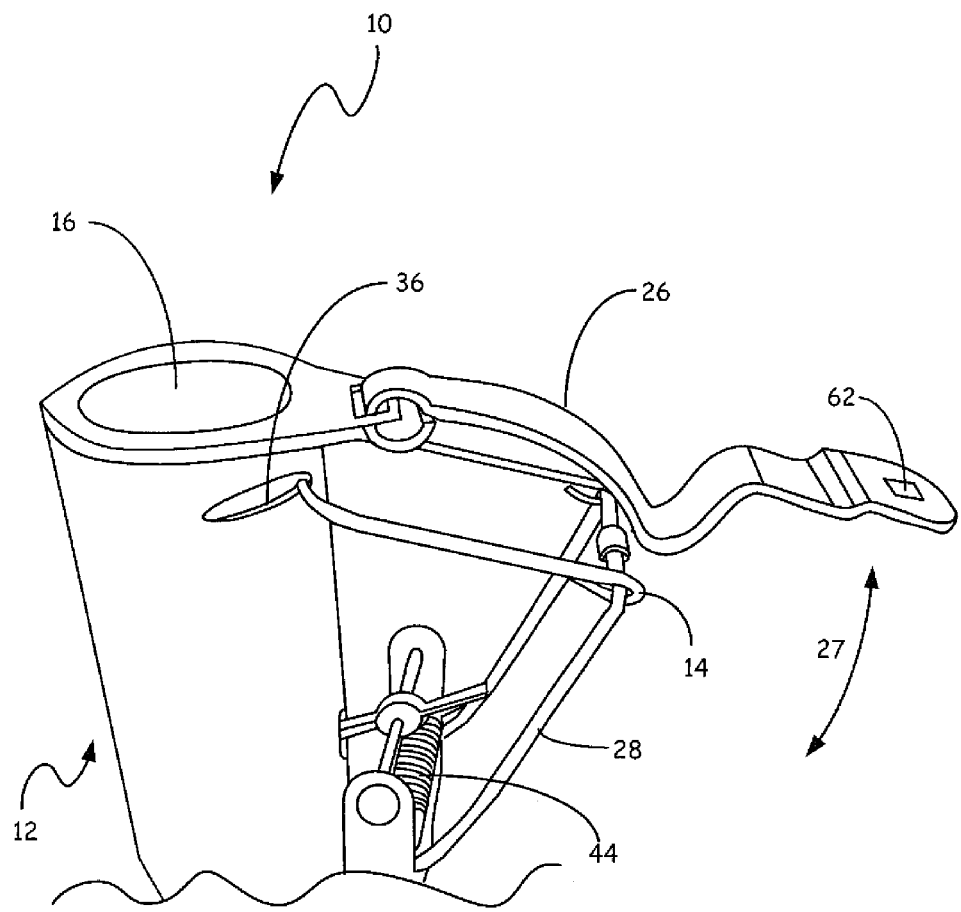
FIG. 3 is a side view of the retaining section of the trap.
Figure 4:
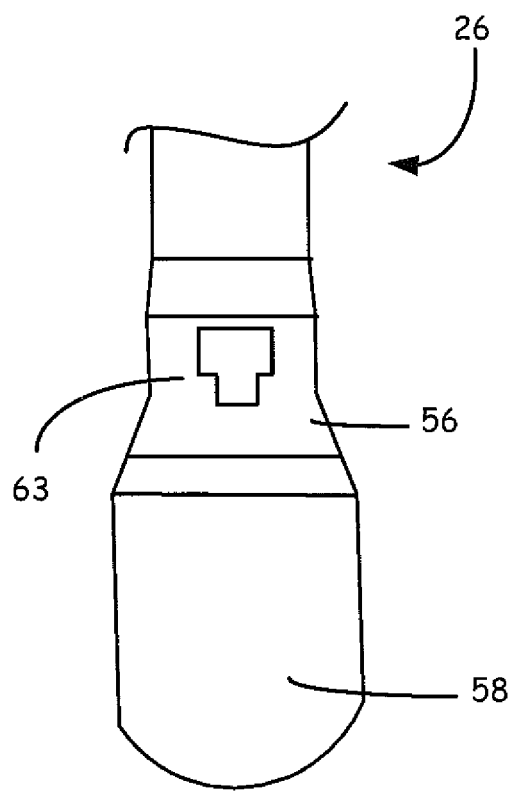
FIG. 4 is a top view of a latch portion of the trap.
Figure 5:
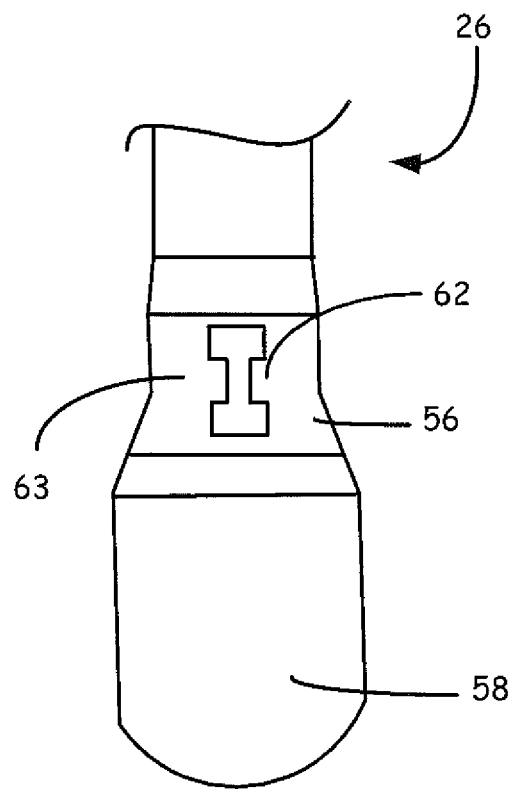
FIG. 5 is a top view of an alternative embodiment of the latch portion.

As illustrated in further detail in FIGS. 3-5, the latch 26 is an elongated steel plate, which is pivotally mounted to the top portion of the tube 12 adjacent the aperture 36 and the retainer 14. The latch 26 is movable in the direction illustrated by arrows 27 between a first position, the retaining position (as illustrated in FIG. 1), along the rotatable cylinder 30 and a second, set position wherein the retainer 14 is set for trapping. The latch 26 is adapted with an upward curve 50, or smooth bend extending from the connection with the tube to approximately the center portion of the latch 26. Proximate the center of the latch 26, the latch is adapted with a "U" shaped bend 52 that connects the curved portion 50 of the latch to the distal end length of the latch 26. The distal end of the latch 26 comprises two sections 56 and 58 which are connected by a step 60. The first flat section 56, proximate the "U" shaped bend 52 is adapted with an aperture or hole 62. The aperture 62 is of a shape that corresponds to the shape of the trigger 32 such that the trigger 32 will engage with the aperture 62 to hold the latch 26 in place. The aperture or hole 62 may be further adapted in any shape to allow release of the trigger and thus the latch to actuate the retainer upon insertion of a limb or movement of the limb within the tube. The second flat section 58 is solid and rounded such that a trapper's thumb would comfortably engage with the distal most portion 58 of the latch 26 in order to more easily move the latch 26 downwardly.

As illustrated in the embodiment in FIG. 4, and the alternative embodiment of FIG. 5, the aperture 62 can be adapted to allow for the trigger to be disengaged from the latch and aperture by movement of the trigger in either a first or second opposing direction. The trigger is engaged in a set position within the aperture by engagement of the trigger 32 with the center section 63 of the aperture 62. Movement of the trigger 32 in either the first or second opposing direction then releases the latch 26 from the aperture 62, the releasing the retainer 14 from the set position.

As the latch 26 is moved against the rotatable cylinder 30 to move the retainer 14 into a set position, the trapper would simply push down on the distal portion 58 of the latch 26 to move the latch 26 downward. The rotatable cylinder 30 on the spring-loaded wire frame 28 cooperates with the latch by rotating and thus rolling against the inner surface of the latch 26, along the curved portion, to facilitate the downward movement. This downward movement of the latch 26 simultaneously moves the retainer 14 in a forward direction into the tube 12. The looped portion 34 is then fully inserted into the tube 12 such that the looped portion 34 extends across the tube 12 such that the looped portion 34 abuts an opposing inner surface of the tube 12 and the tube remains accessible by the animal.

To hold the retainer 14 in the set position, the latch 26 is depressed downwardly until the latch can be connected to and held in place by the trigger 32. The trigger 32 is secured externally to the tube 12 by a pivotable connection with a bar mounted outside the tube. The trigger 32 then extends into the tube 12, proximate the floor 18 of the tube 12 through a substantially vertical aperture 66. A first end 68 of the trigger 32 extends outwardly and away from the tube 12 and is adapted to frictionally engage with the aperture and to apply downward force to an upward facing edge of the aperture 62. The trigger 32 extends into and through the aperture 62, thus holding the latch 26 in the downward position and thus holding the retainer 14 in the open and set position.

The vertical trigger aperture 66 along the length of the tube 12 allows the trigger 32 to move in opposing directions. As illustrated in FIGS. 3-5, a second end 70 of the trigger 32, which is positioned within the tube 12, is adapted with a plate 72. The plate 72, when the latch is set to hold the retainer in a set position, is substantially parallel to the floor 18. The plate is of a cross-section and size such that the plate is moveable in a first and second direction within the tube 12 without contacting the inner surfaces of the tube 12. The plate 72 is secured to upwardly facing side of the second end 70 of the trigger 32. The plate 72 allows the trigger 32 to be displaced by the limb of the animal, as the animal reaches into the tube 12 towards the bait.

Figure 6:
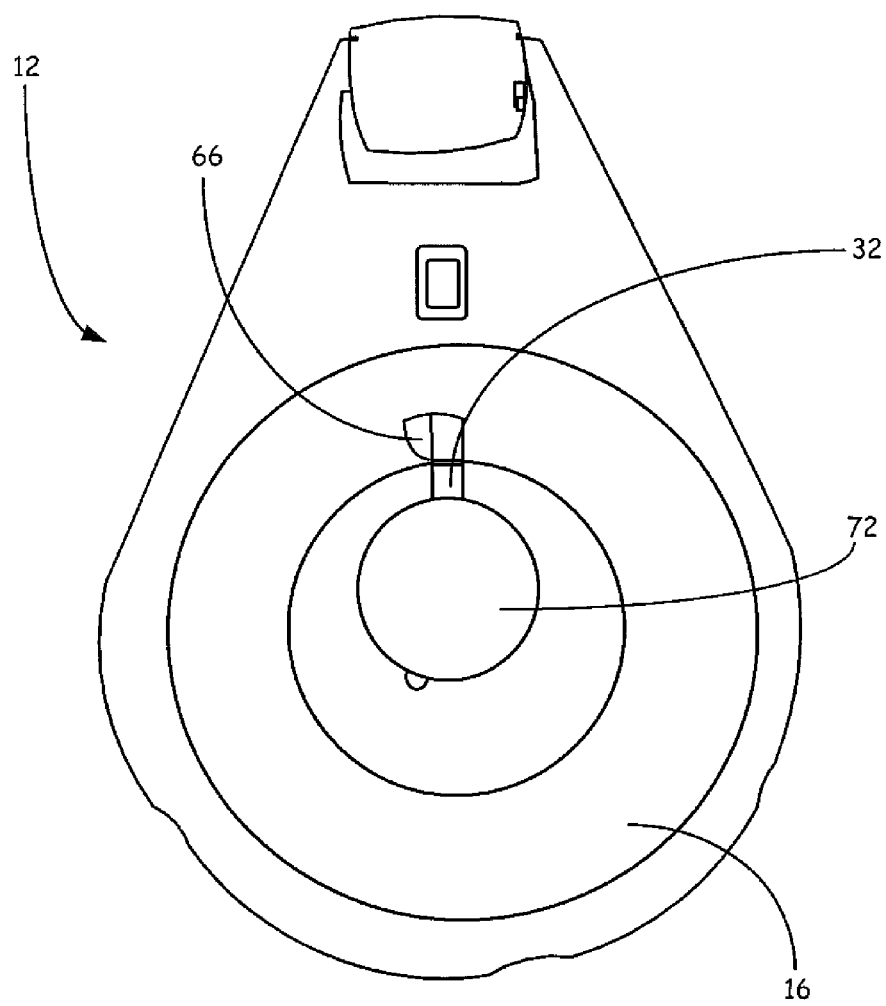
FIG. 6 is a top view of the trap, illustrating the trigger within the tube.
Figure 7:
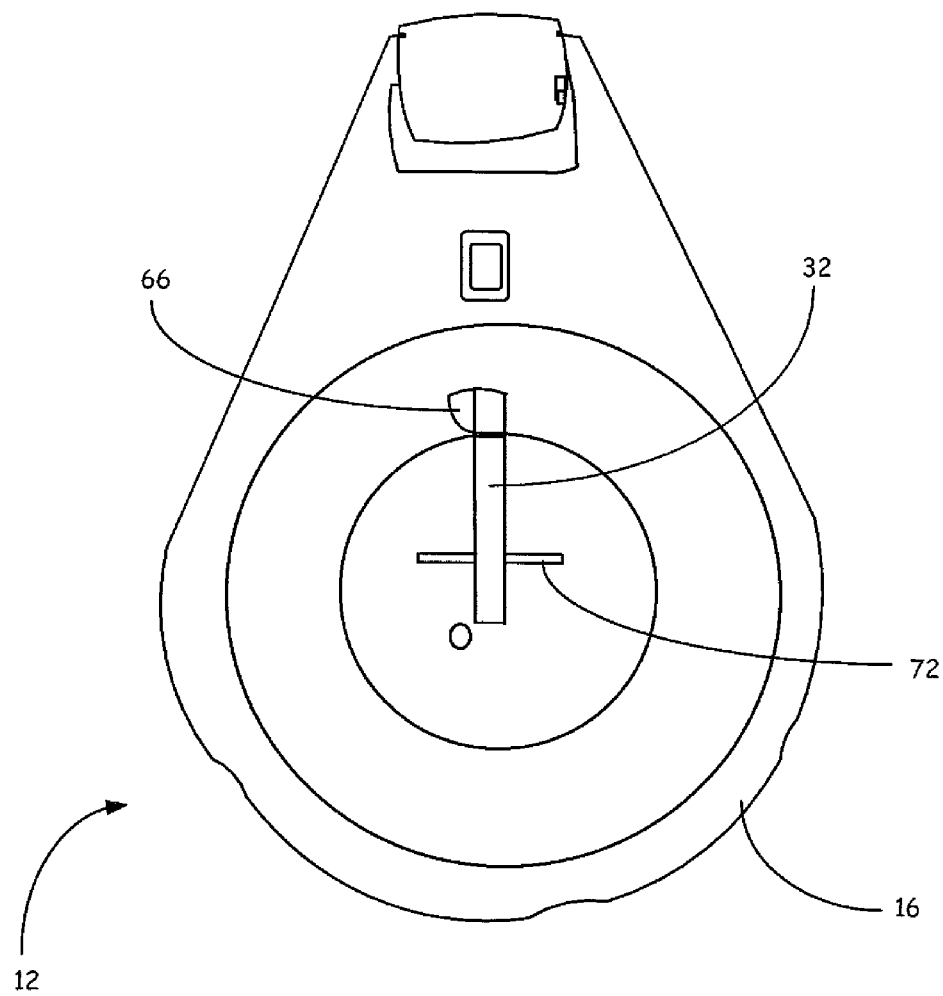
FIG. 7 is a top view of the trap, illustrating an alternative embodiment of the trigger within the tube.

In the set position, the latch 26 overlies the ends of the retainer 14, the connection to and the spring-loaded wire frame 28. The latch 26 is then secured by engagement with the trigger 32 as discussed previously in this disclosure. The trigger 32 prevents the latch 26 from disengaging the retainer 14 and spring-loaded wire frame 28 until an opposing force is applied to the trigger 32 via the plate 72 inside the tube 12. To effect movement of the trigger 32 and to release the latch 26 thus moving the retainer 14 to trap the animal, an animal reaching into or otherwise having a limb in the tube 12 displaces the trigger plate 72 or alternatively, a trigger bar 72 as illustrated in FIG. 6 and the alternative embodiment of illustrated in FIG. 7.

Once the trigger 32 has been moved, in either direction, by force from the animal inserting and/or withdrawing or moving its limb in the tube 12, the trigger 32 disengages from connection with the latch 26, releasing the latch 26. Thus allowing the spring-force to release the wire frame and thus release the retainer 14 from the set position. When the retainer 14 is released from the set position, the loop 34 of the retainer is quickly snapped in a backward direction away from the opposing inner surface of the tube 12. The animal's limb is then caught between the retainer loop and the tube wall.

The device is also adapted with a chain 74 to additionally secure the device 10 to the ground or other surface. The chain 74 is of a selected length and the length can vary based on the size of the device, the location of the device, the animal to be trapped, or any other considerations. The chain 74 then extends away from the device 10 by a connection with the stake 22. The chain 74 can be connected to the stake 22 by any means in which the chain can be pivotably secured to the stake 22. The chain 74 may be further adapted at its distal end 76 with a ring or clip 78 in which an additional stake or other means can be inserted into or connected with, in which to secure the chain to the ground or other surface. The chain can be secured to the ground or other surface being a selected distance from the device.

Although the present invention has been described with reference to preferred embodiments, workers skilled in the art will recognize that changes may be made in form and detail without departing from the spirit and scope of the invention.

What is claimed is:

1. A trap for catching a live animal, the trap comprising:
   a housing,
   a spring-biased loop retainer secured to the housing and movable into and out of the housing;
   a latch having an arcuate section and operably connected to the loop retainer;
   a trigger disposed to engage an aperture in the latch;
   the trigger positioned to extend into and out of the housing; and wherein the arcuate section of the latch engages the spring-biased loop retainer to move the loop retainer into the housing while engaging with the latch.

2. The trap of claim 1 wherein the trigger has a first end and a second end and the aperture engages with the first end of the trigger thereby holding the loop retainer in a set position.

3. The trap of claim 2 wherein the trigger further comprises a plate secured to the second end, the second end being positioned within the housing.

4. The trap of claim 3 wherein the first end of the trigger is configured such that the trigger is released from engagement with the aperture by displacement of the second end of the trigger.

5. The trap of claim 1 wherein the latch includes a non-arcuate section positioned at a distal end of the latch wherein the trigger engaging aperture is positioned within the non-arcuate section of the latch.

6. The trap of claim 5 wherein the non-arcuate section further includes a flat end section adapted for a user to apply force against, such that the arcuate section of the latch engages the loop retainer.

7. The trap of claim 1 and further comprising a ground engaging stake.

8. The trap of claim 1 wherein the housing comprises a tube with an open first end and a second end having a floor.

* * * * *